United States Patent [19]

Hawkins et al.

[11] Patent Number: 5,586,308
[45] Date of Patent: Dec. 17, 1996

[54] CLOCK CONTROL UNIT RESPONSIVE TO A POWER MANAGEMENT STATE FOR CLOCKING MULTIPLE CLOCKED CIRCUITS CONNECTED THERETO

[75] Inventors: Keith G. Hawkins, Dripping Springs; Carl K. Wakeland, Austin, both of Tex.

[73] Assignee: Advanced Micro Devices, Inc., Sunnyvale, Calif.

[21] Appl. No.: 325,905

[22] Filed: Oct. 19, 1994

[51] Int. Cl.⁶ ..................................................... G06F 1/06
[52] U.S. Cl. ..................................................... 395/556
[58] Field of Search ........................ 395/550; 327/107, 327/114, 291, 295; 331/61

[56] References Cited

U.S. PATENT DOCUMENTS

| | | | |
|---|---|---|---|
| 4,931,748 | 6/1990 | McDermott et al. | 331/1 A |
| 5,378,935 | 1/1995 | Korhonen et al. | 327/114 |
| 5,389,830 | 2/1995 | Buckingham et al. | 327/291 |

Primary Examiner—Thomas M. Heckler
Attorney, Agent, or Firm—Kevin L. Daffer; Conley, Rose & Tayon

[57] ABSTRACT

An integrated processor is fabricated on a single monolithic circuit and employs circuitry to accommodate data-intensive, view-intensive and voice-intensive requirements of modern-day PIDs. The integrated processor includes a CPU core, a memory controller, and a variety of peripheral devices to achieve versatility and high performance functionality. The integrated processor consumes less power by provision of a clock control unit including a plurality of phase-locked loops for generating clock signals of differing frequencies to appropriately clock the various subsystems of the integrated processor. The clock signals provided to the various subsystems by the clock control unit are derived from a single crystal oscillator input signal. A power management unit is incorporated within the integrated processor to control the frequency and/or application of certain clock signals to the various subsystems, as well as to control other power management related functions. The pin-count of the integrated processor is finally minimized by allowing the selective multiplexing of certain external pins depending upon the desired functionality of the integrated processor.

20 Claims, 5 Drawing Sheets

CLOCK CONTROL UNIT RESPONSIVE TO A POWER MANAGEMENT STATE FOR CLOCKING MULTIPLE CLOCKED CIRCUITS CONNECTED THERETO

BACKGROUND OF THE INVENTION

1. Field of the Invention

This invention relates to a computer system and more particularly to the interconnection of a power management unit (PMU) to a clock control unit having multiple phase-locked loops for programmably clocking various clocked circuits according to an operational state of the PMU.

2. Description of the Relevant Art

Manufacturers have demonstrated an ability to place an increasing amount of circuitry upon a single monolithic semiconductor substrate or "chip". The advent of portable data processing systems, herein referred to as personal information devices ("PIDs"), has lead a push toward placing an even greater amount of circuitry on a single chip. As defined herein, PIDs include any portable CPU-based system, such as pocket personal computers (PCs), digital assistants (test units, meters, etc.), "smart" phones, and electronic calendars, organizers, booklets, etc.

Functional demands of modern PIDs typically require that they be data-intensive, view-intensive and/or voice-intensive. For example, a pocket personal computer may be called upon to perform extensive data calculations involving data-intensive functions. Additionally, a pocket personal computer may also require, for example, a detailed, object-oriented display requiring view-intensive functions. On the other hand, a smart phone may require voice-intensive functions, and not necessarily view and/or data-intensive functions. Therefore, an integrated processor system which is intended for use within of a wide range of PID applications must include the necessary subsystems to accommodate all three types of functionality.

In addition to the above technical features, an integrated processor for PIDs must also operate at low power within a small package outline, and should preferably be available at a low cost. Unfortunately, an effort to lower cost by reducing, for example, the pin-count of the integrated processor may require the elimination of certain desirable subsystems of the integrated processor, thus limiting functionality and/or performance. Power consumption may similarly be adversely affected by the incorporation of certain subsystems or by the requirement of a variety of differing crystal oscillator circuits to clock the various subsystems. Integrated processors for PIDs which achieve acceptable performance capabilities while maintaining wide versatility, small size, low power consumption, and low cost are largely unavailable.

A high performance, versatile integrated processor is therefore desirable which is adaptable to data-intensive, view-intensive and/or voice-intensive PID applications. Such an integrated processor should additionally be characterized by small size, low power consumption, and low cost.

SUMMARY OF THE INVENTION

The problems outlined above are in large part solved by a highly integrated, low-power integrated processor in accordance with the present invention. The integrated processor is fabricated on a single monolithic circuit and employs circuitry to accommodate data-intensive, view-intensive and voice-intensive requirements of modern-day PIDs. Importantly, the integrated processor includes a CPU core, a memory controller, and a variety of peripheral devices to achieve versatility and high performance functionality. The integrated processor consumes less power by provision of a clock control unit including a plurality of phase-locked loops for generating clock signals of differing frequencies to appropriately clock the various subsystems of the integrated processor. The clock signals provided to the various subsystems by the clock control unit are derived from a single crystal oscillator input signal. Since only one external crystal oscillator circuit is required, power consumption is substantially reduced. A power management unit is further incorporated within the integrated processor to control the frequency and/or application of certain clock signals to the various subsystems, as well as to control other power management related functions. The pin-count of the integrated processor is finally minimized by allowing the selective multiplexing of certain external pins depending upon the desired functionality of the integrated processor. In one user-defined mode, the external pins are allocated to an internal video controller, such as a CGA LCD controller. In another mode, the external pins are allocated to provide an external interface to selected lines of a CPU local bus of the integrated processor. In yet an additional mode, the external pins are allocated to provide an external interface to selected lines of a peripheral bus, such as an ISA-style bus, of the integrated processor. Wide versatility of the integrated processor is thereby advantageously achieved while minimizing the overall pin count of the integrated processor.

In one embodiment, the integrated processor system includes a CPU core and a memory controller connected to a CPU local bus. The integrated processor further includes a selected set of peripheral devices coupled to a peripheral interconnect bus including a bus interface unit, a programmable timer, a direct memory access (DMA) controller, an interrupt controller, a real time clock, a video controller, a parallel/serial port and a PCMCIA controller. The CPU core, bus interface unit, DMA controller, programmable timer, serial port and video controller are each clocked by a distinct clock signal generated by a clock control unit embodied within the integrated processor. The clock control unit produces clock signals of distinct frequencies which drive the above-mentioned subsystems. The clock control unit operates from a single oscillator crystal input. Coupled to receive the single oscillator crystal input within the clock control unit is a frequency synthesizer including one or more frequency multipliers and dividers. According to a preferred embodiment, each frequency multiplier comprises a phase-locked loop circuit. The clock control unit synthesizes from the single input frequency multiple, distinct clock frequencies necessary to operate the various circuitry connected to the CPU local bus and peripheral interconnect bus.

The multiple phase-locked loop circuits are controlled according to a predetermined power management algorithm set forth in a power management unit (PMU). The power management unit is coupled to receive signals indicative of system activity. During periods of inactivity or at user-defined times selectable by software, the PMU changes from one power management state to another. A change in power management state generally results in a change in the assertions of various enable signals provided from the power management unit to the clock control unit. The enable signals selectively control the enablement of the phase-locked loop circuits within the clock control unit and the gating of selected clock signals to conserve power.

BRIEF DESCRIPTION OF THE DRAWINGS

Other objects and advantages of the invention will become apparent upon reading the following detailed description and upon reference to the accompanying drawings in which.

Figure 1:
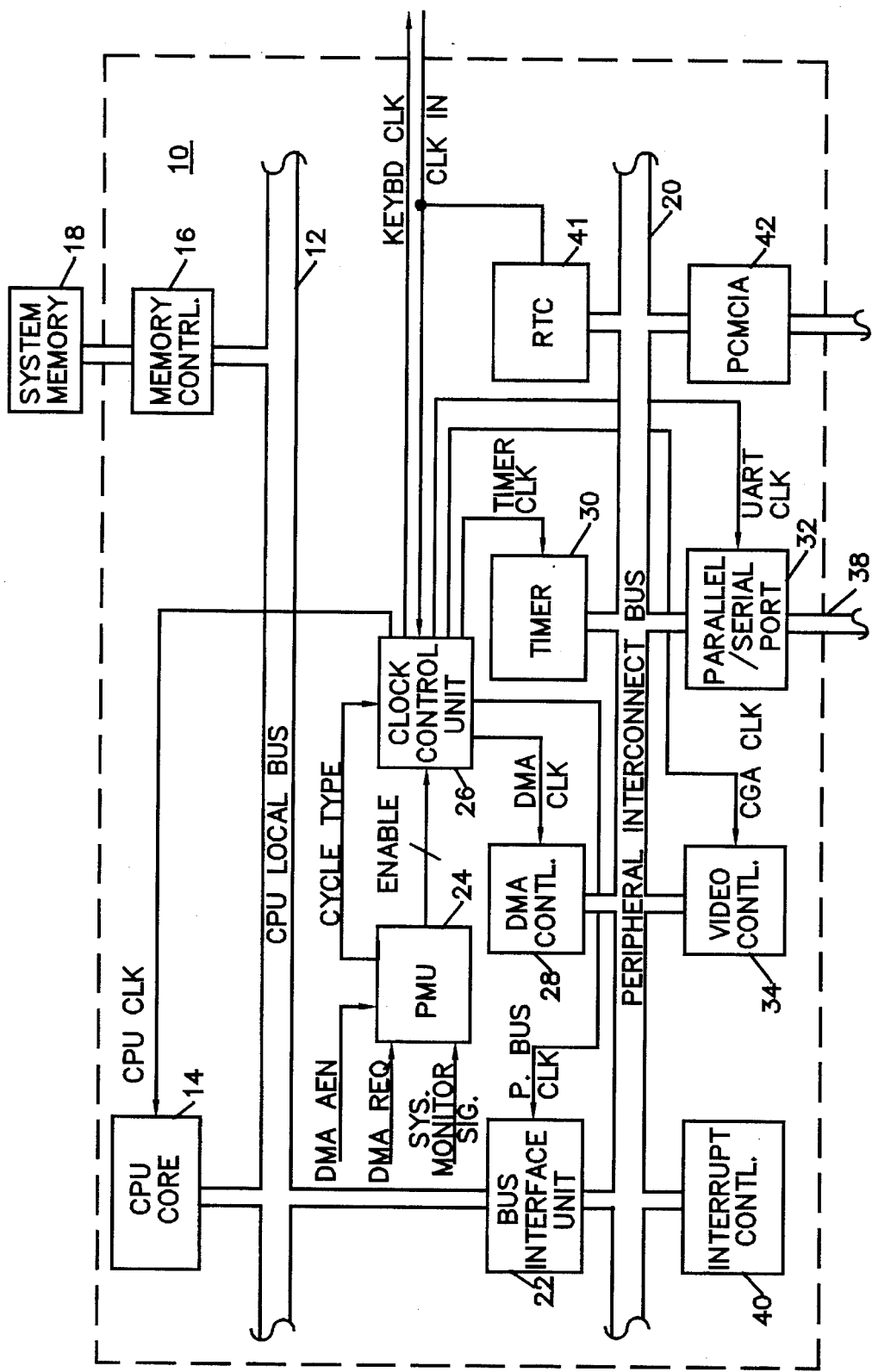
FIG. 1 is a block diagram of an integrated processor system including a CPU core, a memory controller, a variety of peripheral devices, a clock control unit, and a related power management unit embodied upon a single monolithic chip according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a block diagram of an integrated processor 10 including a variety of subsystems fabricated upon a single monolithic semiconductor substrate. In the illustrated embodiment, integrated processor 10 includes a CPU core 14 coupled to a memory controller 16 via a CPU local bus 12. CPU core 14 is a data processing unit which implements a predetermined instruction set and, as defined herein, includes any central processing unit core having the basic features of, inter alia, an ALU, a control/timing unit, and various registers. Exemplary CPU cores include the core of an Am386SXLV microprocessor manufactured by Advanced Micro Devices, Inc. CPU core 14 as well as other subsystems of integrated processor 10 are preferably processed according to a complimentary metal oxide semiconductor (CMOS) technique.

Memory controller 16 orchestrates the transfer of data between a system memory 18 and CPU local bus 12, and may employ relative addressing, indexed addressing and/or paged addressing techniques. In one embodiment, memory controller 16 is configured to support either random access memory (DRAM or SRAM) or read only memory (ROM). Memory controller 16 preferably operates synchronously with CPU core 14 to ensure maximum transfer bandwidth to and from system memory 18 via CPU local bus 12, and may employ an EMS-compatible memory mapping system with page registers.

Integrated processor 10 also includes a bus interface unit 22 coupled between CPU local bus 12 and a peripheral interconnect bus 20. Bus interface unit 22 is provided as an interface to control the transfer of data and address signals between CPU local bus 12 and peripheral interconnect bus 20. A variety of suitable configurations of bus interface unit 22 are well known.

In a preferred embodiment, peripheral interconnect bus 20 is configured as an ISA (Industry Standard Architecture) style bus. It is understood, however, that peripheral interconnect bus 20 could be alternatively implemented in accordance with a variety of other bus configurations including, for example, an EISA (Extended Industry Standard Architecture) bus configuration or a PCI (Peripheral Component Interface) bus configuration.

Several AT-compatible peripheral devices are additionally incorporated within integrated processor 10. Specifically, a DMA controller 28, a timer 30, a parallel/serial port 32, a video controller 34, an interrupt controller 40, a real time clock (RTC) 41, and a PCMCIA controller 42 are illustratively coupled to peripheral interconnect bus 20. Each of these peripheral devices are well-known in discrete form and therefore, in the interest of simplicity and clarity, only a brief description of each is provided herein below.

DMA controller 28 is provided to independently control the transfer of data between system memory 18 and various I/O peripheral devices such as, for example, mass storage devices (i.e., disk drives, CD-ROM units, etc.) which may be externally coupled to integrated processor 10. In one implementation, DMA controller 28 is functionally compatible with a pair of cascade-coupled type Am8237A DMA controllers manufactured by Advanced Micro Devices, Inc.

Timer 30 is provided to control general purpose timing functions such as one-shot functions and programmable rate functions. In one embodiment, timer 30 is functionally compatible with a type 8253 programmable interval timer manufactured by Advanced Micro Devices, Inc.

Parallel/serial port 32 includes both a parallel and a serial port. In one embodiment, the parallel port is functionally compatible with a PS/2 parallel port and the serial port is functionally compatible with a type 16450 UART.

Video controller 34 is provided to control an externally connected display unit such as a liquid crystal display (LCD). In the preferred embodiment, video controller 34 is configured as a CGA-compatible LCD controller.

Interrupt controller 40 is provided to centrally sort, prioritize, and control interrupt signals generated by various interrupt sources. In one implementation, interrupt controller 40 is functionally compatible with a pair of cascade-coupled type 8259 interrupt controllers manufactured by Advanced Micro Devices, Inc.

Real time clock 41 is provided to maintain time-keeping functions such as time-of-day, and may be implemented using a type 146818A compatible RTC. Finally, PCMCIA controller 42 is provided to accommodate externally connected PCMCIA-compatible expansion cards.

In addition to the aforementioned AT-compatible peripherals, FIG. 1 finally illustrates a power management unit (PMU) 24 and a clock control unit 26 within integrated processor 10. As will be explained in greater detail below in conjunction with FIG. 2, clock control unit 26 is configured to generate a plurality of distinct clock signals for clocking various subsystems associated with integrated processor 10. More particularly, during operation, clock control unit 26 generates a CPU clock for clocking CPU core 14, a peripheral bus clock signal for clocking bus interface unit 22, a UART clock signal for clocking the serial port of parallel/serial port 32, a CGA clock signal for clocking video controller 34, a timer clock signal for clocking timer 30, a keyboard clock signal for clocking an externally connected keyboard (not shown), and a DMA clock signal for clocking DMA controller 28. Clock control unit 26 derives these clock signals from a single clock reference signal labelled "CLOCK IN" which may be provided to integrated processor 10 from an external crystal oscillator circuit (not shown). It is noted that since only a single external crystal oscillator source is required to generate the clock signals necessary for all subsystems, overall power consumption may be substantially reduced (in comparison to a situation wherein multiple crystal oscillator circuits are employed).

Generally speaking, power management unit 24 is provided to manage the overall power consumed by a system employing integrated processor 10. In one embodiment, power management unit 24 monitors various system activities and responsively generates a set of enable signals and a control signal labelled "CYCLE TYPE" which control the generation and application of various clock signals by clock control unit 26. Further details regarding clock control unit 26 as well as an exemplary embodiment of power management unit 24 are described next in conjunction with FIGS. 2–4.

Figure 2:
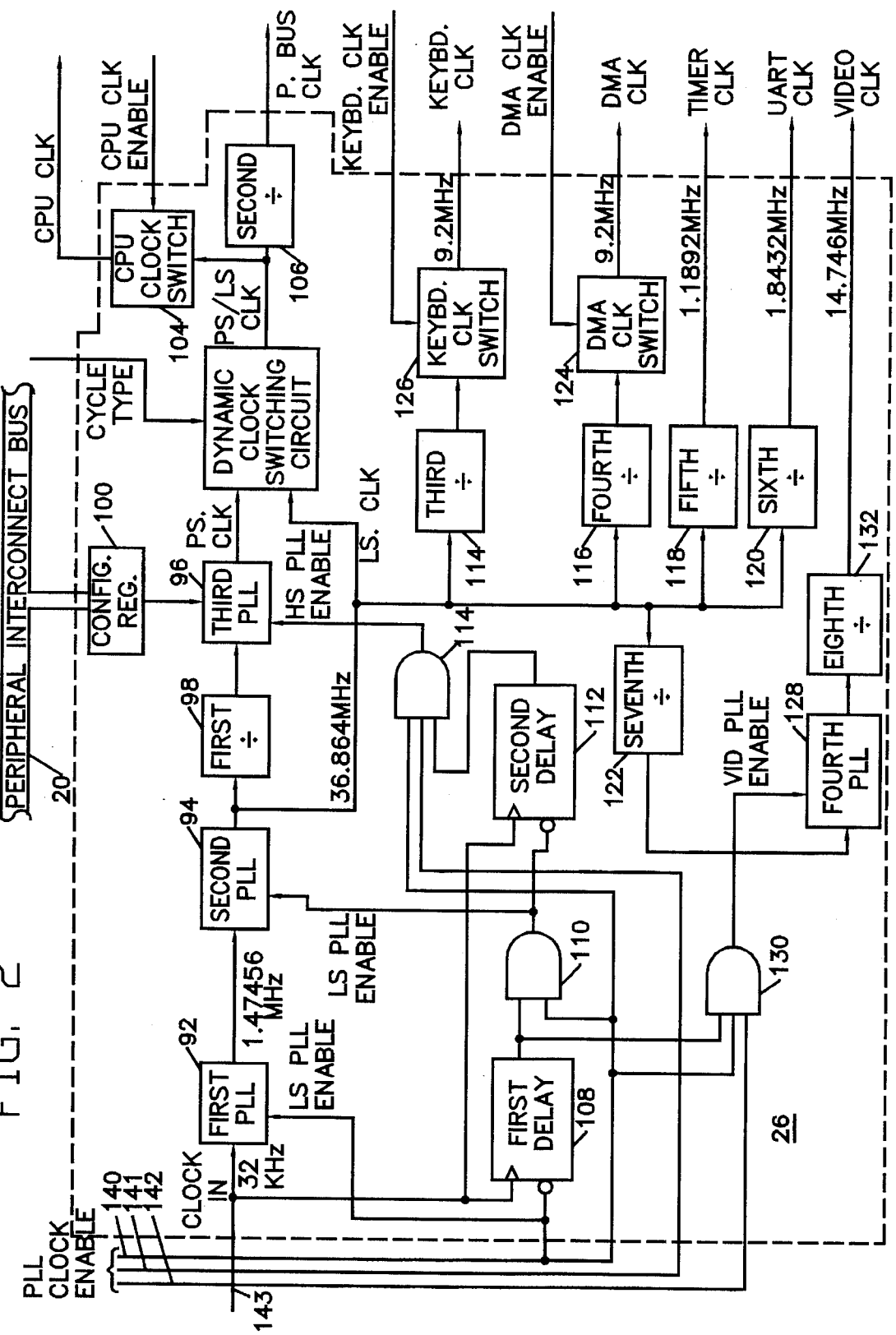
FIG. 2 is a block diagram of a clock control unit and associated input/output signals according to one embodiment of the present invention.

Turning now to FIG. 2, a block diagram of clock control unit 26 is shown. Clock control unit 26 includes a frequency synthesizer adapted to receive a clock reference signal (i.e., CLOCK IN) of a given frequency and, in response to that signal, to generate a plurality of clock signals of dissimilar frequencies to clock various subsystems of integrated processor 10. The frequency synthesizer includes one or more frequency multipliers, one or more frequency dividers, or a combination of frequency multipliers and dividers. In the preferred embodiment, each frequency multiplier comprises a phase-locked loop.

Accordingly, FIG. 2 illustrates first, second and third phase-locked loop circuits 92, 94 and 96, respectively. The frequency multiplication factor associated with the first phase-locked loop 92 can be dissimilar from the multiplication factors associated with the second phase-locked loop 94 and the third phase-locked loop 96. For example, in one embodiment the multiplication factor of first phase-locked loop 92 is forty-five such that an input clock frequency of approximately 32 KHz, for example, is multiplied to produce an output from first phase-locked loop 92 of 1.474 MHz. Second phase-locked loop 94 is configured with, for example, a multiplication factor of twenty-five to increase the 1.474 MHz input frequency to 36.864 MHz.

First divider 98, like the other dividers illustrated in FIG. 2 and described below, is a digital circuit employing one or more counting devices. Frequency dividers can be implemented using bi-stable multivibrators such as, for example, series-connected flip flops. In one embodiment, first divider 98 is associated with a divisor of fourteen, and thus an input signal to first divider 98 having a frequency of 36.864 MHz results in an output signal of approximately 2.63 MHz to be produced therefrom.

The 2.63 MHz output signal from first divider 98 can be frequency multiplied by third phase-locked loop 96 in accordance with a programmable set of multiplication factors. Thus, the output of third phase-locked loop 96 noted as the programmable speed clock (PS CLK) can be set at various programmable clock frequencies. Software programmability of third phase-locked loop 96 is achieved through a configuration register 100 coupled to peripheral interconnect bus 20. In one implementation, third phase-locked loop 96 may be programmed to generate the programmable speed clock (PS CLK) at a frequency of either 40 MHz, 50 MHz, 66 MHz, or 80 MHz.

Coupled to the output of third phase-locked loop circuit 96 is a dynamic clock switching circuit 102. Switching circuit 102 is also coupled to receive the output signal (LS CLK) from second phase-locked loop circuit 94. Depending upon the CYCLE TYPE signal received from power management unit 24 (i.e., FIG. 1), switching circuit 102 couples either the PS CLK signal or the LS CLK signal to a CPU clock switch 104 and to a second divider 106. As will be explained in further detail below, the CPU TYPE signal indicates whether a current bus cycle on CPU local bus 12 is directed to a device residing on local bus 12 or to a device residing on peripheral interconnect bus 20.

CPU clock switch 104 is an electronic switch capable of selectively gating the output signal PS/LS CLK from switching circuit 102 in response to an enable signal CPU CLK ENABLE from power management unit 24. When CPU clock switch 104 is enabled, the PS/CLK signal is provided as the CPU clock signal CPU CLK. If the (CPU CLK) ENABLE signal is deasserted, the CPU clock signal is gated off. As will be explained further below, the CPU clock signal may be gated off during certain power management states to conserve power.

Second divider 106 is provided to generate the peripheral bus clock signal P. BUS CLK which clocks the bus interface unit 22 (FIG. 1). The peripheral bus clock signal controls the timing of cycles executed on peripheral interconnect bus 20 by bus interface unit 22. In one embodiment, second divider 106 is associated with a divisor of two. It is noted that the control circuitry within bus interface unit 22 which is clocked by the peripheral bus clock signal and which drives peripheral interconnect bus 20 is active only during cycles involving slaves residing on peripheral interconnect bus 20. Accordingly, in accordance with switching circuit 102 as controlled by the CPU TYPE signal, master cycles executed by bus interface unit 22 on peripheral interconnect bus 20 are clocked by a signal which is one-half the frequency of the LS CLK signal. It is further noted that the CPU CLK signal is similarly scaled down in frequency (i.e., to the frequency of the LS CLK signal) during such cycles to conserve power.

FIG. 2 further illustrates a set of phase-lock loop enable lines for selectively enabling the first, second, and third phase-lock loops 92–96 in response to corresponding enable signals from power management unit 24. Specifically, a line 140 is provided to receive an enable signal to enable first phase-lock loop 92 and second phase-lock loop 94, and a second line 141 is provided to receive an enable signal to enable third phase-lock loop 96. Coupled between the line 143 which receives the CLOCK IN signal and the second phase-locked loop 94 is a first delay circuit 108 for providing a delay in enabling second phase-locked loop 94 after first phase-locked loop 92 is enabled. For proper timed operation of phase-locked loop circuits 92 and 94, delay 108 is activated simultaneous with first phase-locked loop 92 by the low speed enable signal LS PLL ENABLE. The low speed enable signal is also forwarded to one input of gate 110 to delay-activate second phase-locked loop circuit 94. Activation of the third phase-locked loop circuit 96 is delayed in a similar manner by second delay circuit 112 for a period after which second phase-locked loop circuit 94 is enabled (i.e., if the corresponding enable signal at line 141 is also asserted). Thus, two of the enable signals sent from PMU 24 are used to enable first, second and third phase-locked loop circuits 92–96 in accordance with LS PLL and HS PLL ENABLE signals.

If phase-locked loop 94 is enabled, a low speed clock LS CLK of, for example, 36.864 MHz is provided to various parallel-connected dividers denoted as third divider 114, fourth divider 116, fifth divider 118, sixth divider 120 and seventh divider 122. Each divider can have a dissimilar division factor from that of the other dividers such that, for example, third divider 114 is a divide-by-four necessary to reduce low-speed clock from, for example, 36.864 MHz to approximately 9.2 MHz to generate the keyboard clock signal. Fourth divider 116 can also be a divide-by-four divider to generate a 9.2 MHz DMA controller clock signal, whereas fifth divider 118 can, for example, be associated with a divisor of thirty-one to generate a 1.189 MHz timer clock signal. Sixth divider 120 can, for example, have a divide-by-twenty division factor to generate, for example, a 1.84 MHz UART clock signal. The DMA clock output from fourth divider 116 and the keyboard clock output from third divider 114 can be selectively enabled or disabled by a respective DMA clock switch 124 and keyboard clock switch 126. Keyboard clock enable (KEYBD CLK ENABLE) and DMA clock enable (DMA CLK ENABLE) are also provided from the power management unit 24 to selectively gate the respective clock during various power management states.

By deasserting the enable signal at line 141, the third phase-locked loop 96 can be turned off thereby completely deactivating the CPU clock as well as the peripheral bus clock. The first and second phase-locked loops 92, 94 can be deactivated upon deassertion of the enable signal at line 140, resulting not only in the turning off of the CPU and peripheral bus clocks, but also in the turning off of all other clocks generated by clock control unit 26. Accordingly, deassertion of the enable signal at line 140 can, according to one embodiment, turn off keyboard clock (KEYBD CLK), DMA clock (DMA CLK), timer clock (TIMER CLK), UART clock (UART CLK) and video clock (VIDEO CLK).

A third enable line 142 is shown coupled to an AND gate 130. An output from gate 130 enables a fourth phase-locked loop circuit 128 via a video enable signal (VID PLL ENABLE). Fourth phase-locked loop circuit 128, upon assertion of the video enable signal, increases the clocking frequency resulting from the output of seventh divider 122. The frequency from seventh divider 122, assuming an exemplary low-speed clock frequency of 36.864, is 2.048 MHz. In one implementation, fourth phase-locked loop circuit 128 multiplies the exemplary 2.048 MHz by, for example, a multiplication factor of fourteen to generate a 28.67 MHz signal. The exemplary output frequency of 28.67 MHz can then be divided by an eighth divider 132 having, for example, a divide-by-two division factor to generate a 14.746 MHz video clock signal. It is noted that enablement of the fourth phase-locked loop 128 is delayed by first circuit 108 in a manner similar to the enablement of second phase-locked loop 94.

Figure 3:
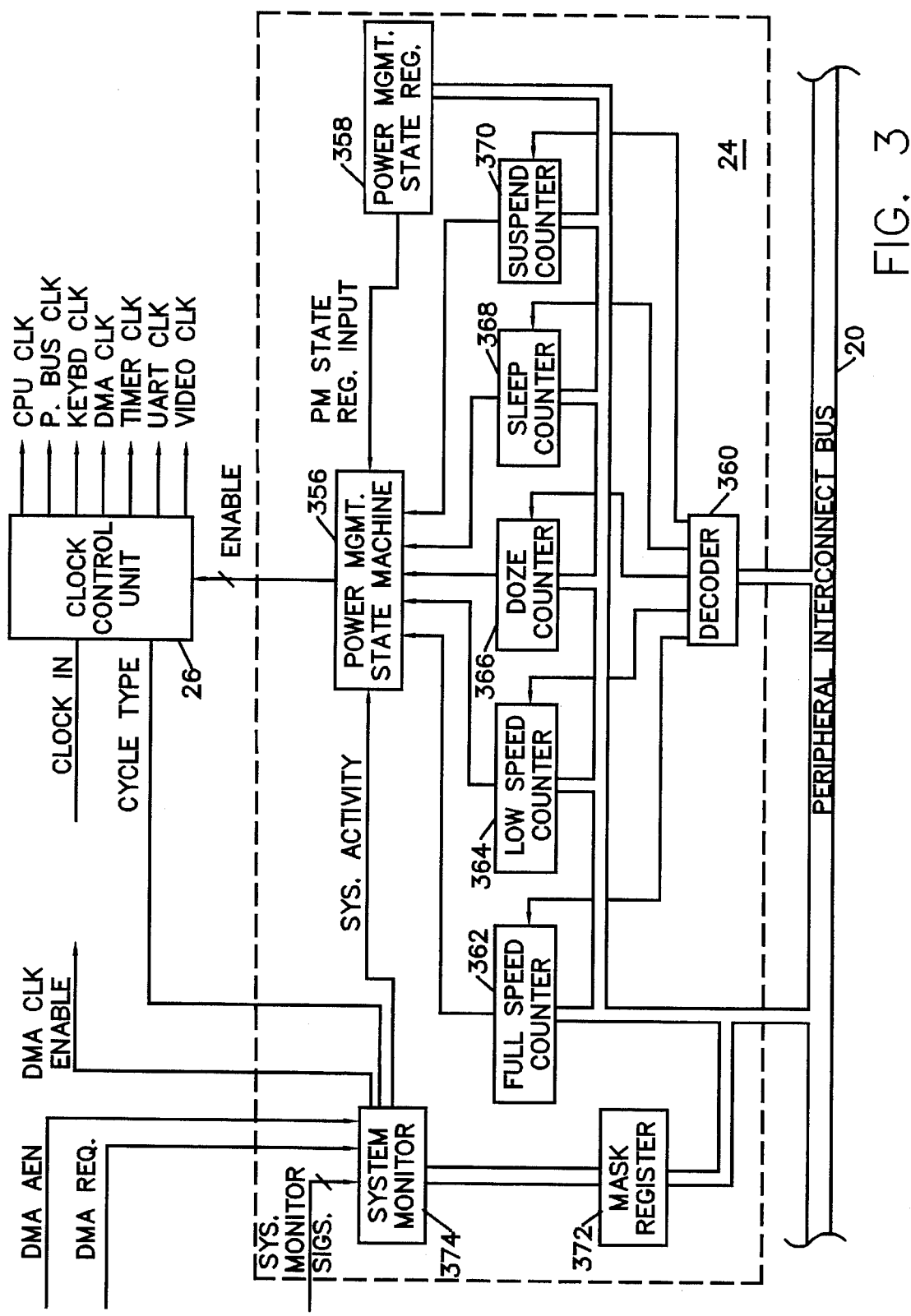
FIG. 3 is a block diagram of a power management unit (PMU) and associated input/output signals according to one embodiment of the present invention.

Turning now to FIG. 3, a block diagram of one implementation of power management unit 24 is illustrated in further detail. Power management unit 24 is shown connected to peripheral interconnect bus 20 and clock control unit 26. As stated previously, power management unit 24 monitors various system activities and responsively generates the enable signals and CYCLE TYPE control signal which control the generation and application of the various clock signals synthesized by clock control unit 26. While the following description and accompanying drawings include details regarding one specific configuration of power management unit 24, it is understood that integrated processor 10 could alternatively employ a power management unit which operates in accordance with a variety of other specific power management algorithms.

Figure 4:
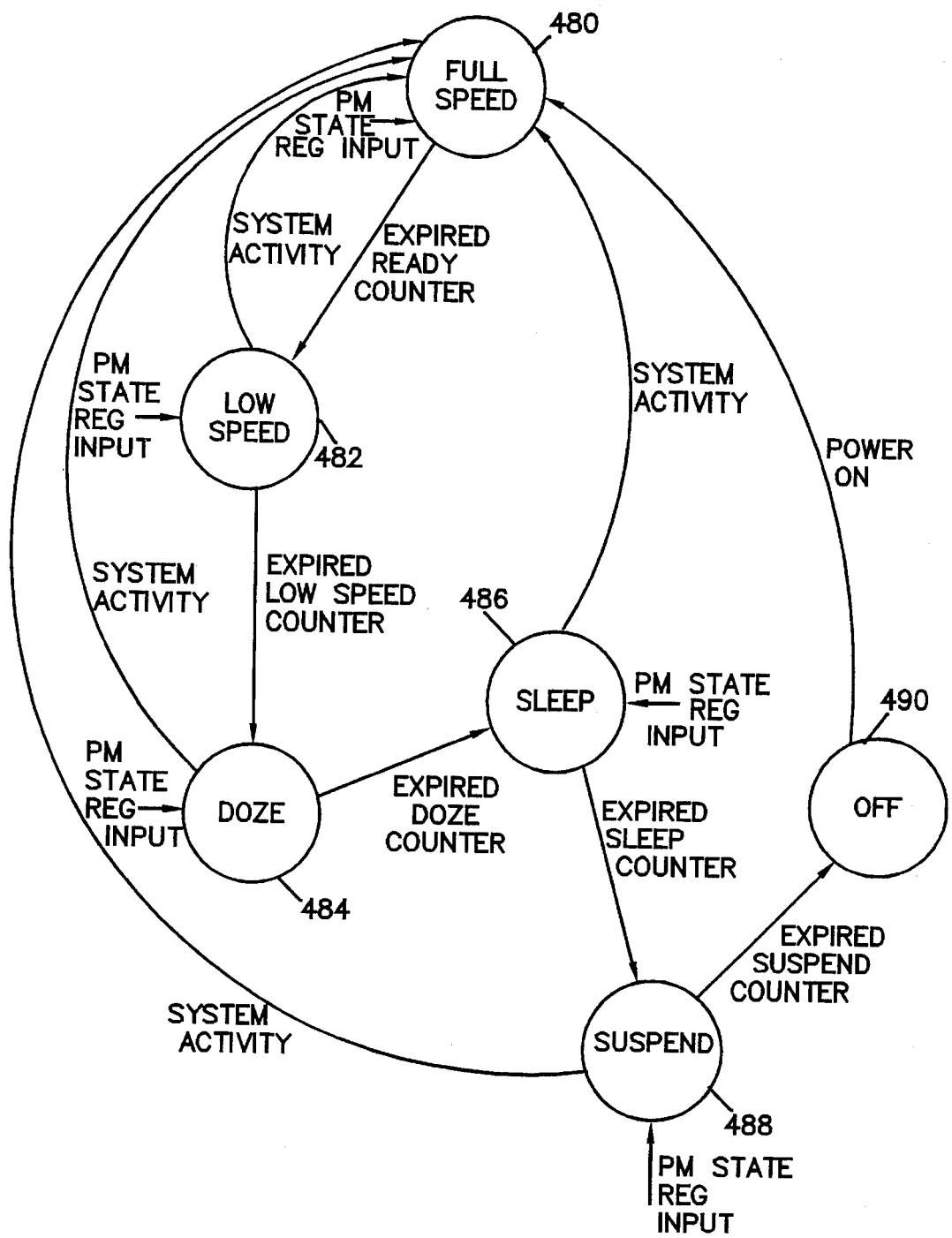
FIG. 4 is a state diagram depicting various power management states of the power management unit.

Power management unit 24 includes a power management state machine 356 which is configured to transition between a plurality of power management states depending upon the occurrence or non-occurrence of a variety of predetermined system events. FIG. 4 is a state transition diagram which depicts the states associated with power management state machine 356. Assertions of the various enable signals provided to clock control unit 26 are dependent upon the particular state of power management unit 356. Specific details follow.

Power management unit 24 includes a system monitor 374 for monitoring selected signals (labelled "SYS. MONITOR SIGS.") indicative of predetermined system events. Examples of such events are I/O decodes to certain addresses, DMA requests, interrupts, and changes in status signals. FIGS. 3 and 4 illustrate, according to one exemplary embodiment, five state-transition counters 362–370 and six power management states 480–490. The five counters are labeled: full speed counter 362, low speed counter 364, doze counter 366, sleep counter 368 and suspend counter 370; and the six power management states are labeled: full speed 480, low speed 482, doze 484, sleep 486, suspend 488 and off 490. As will be explained further below, each power management state drives the enable signals provided to clock control unit 26 in a predetermined manner (which may be programmable by the user or system designer). Each counter controls a time-out period which is associated with a corresponding power management state. The expiration of a given time-out period causes the power management state machine to transition to a lower power management state. For example, time-out expiration of full-speed counter 362 causes a transition from full speed state 480 to low speed state 482, and time-out expiration of low speed counter 364 causes a transition from low speed state 482 to doze state 484, and so on. It is noted that each counter is reset upon the occurrence of any of the predetermined system events as detected by system monitor 374, and that detection of such causes power management state machine 356 to transition to full speed state 480. It is further noted that the time-out period associated with full-speed counter 362 is shorter than that of low speed counter 364, and that the time-out period associated with low speed counter 364 is shorter than that of doze counter 366, and so on. In the preferred embodiment, the time-out period associated with each counter may be programmed via decoder 360. A mask register 372 may further be set to mask the detection of selected system activities by system monitor 374. In addition, the state of power management state machine 356 may be directly varied via software control of power management state register 358.

Accordingly, during periods of system inactivity (as determined by the non-occurrence of system events detected by system monitor 374), power management state machine 356 sequentially transitions to lower power management states. Upon occurrence of a monitored system event, state machine 356 results back to the full speed mode 480. It is understood that more than five or less than five counters could be employed within power management unit 24 depending upon the number of desired power management states. FIGS. 2 and 3 illustrate, merely as an example, five counters and six power management states.

System monitor 374 is further configured to employ bus "snooping" or monitoring techniques to determine whether a current cycle corresponds to an access to a peripheral residing upon peripheral interconnect bus 20. If system monitor 374 detects such a cycle, the CYCLE TYPE signal is driven such that the switching circuit 102 (FIG. 2) selects the LS CLK signal. During cycles confined to CPU local bus 12, the switching circuit 102 selects the PS CLK signal.

The system monitor of power management unit 24 is finally configured to monitor signals DMA REQ and AEN associated with DMA controller 28 (FIG. 1) and to selectively assert a DMA clock enable signal (DMA CLK ENABLE) if either a DMA REQ (DMA request) signal or the AEN (address enable) signal is asserted. Those skilled in the art will appreciate that these signals are indicative of a pending or a current DMA operation. As illustrated in FIGS. 1–3, the DMA CLK ENABLE signal controls the application of the DMA CLK signal to DMA controller 28 such that, if a DMA operation is not pending or occurring, the DMA CLK signal will be gated from DMA controller 28, regardless of the current state of power management state machine 356. Power is thereby conserved.

The following Table I indicates the control of various clock signals by power management state machine 356 according to one exemplary embodiment during each operational state. Table I illustrates the effect of enable signals defined at various power management states, described above, upon various clock signals. It is thereby noted that the generation of certain clock signals may be programmable during various power management states as follows:

TABLE I

| STATE | HS/LS CPU CLK | LS CPU CLK | VIDEO CLK | DMA CLK | KYBD CLK | TIMER/ UART CLK |
|---|---|---|---|---|---|---|
| Full-Speed | On | On | On | On | On | On |
| Low-Speed | On | On | On | On | On | On |
| Doze | Off | Off | On/Off | Off | On/Off | On/Off |
| Sleep | Off | Off | On/Off | Off | Off | On/Off |
| Suspend | Off | Off | On/Off | Off | Off | On/Off |
| Off | Off | Off | On/Off | Off | Off | On/Off |

As shown in the above table, during the full-speed state 480 of FIG. 4, all phase-locked loops are enabled. Dynamic switching by switching circuit 102 to the high speed clock (PS CLK) is allowed during memory, local bus and CPU core idle cycles. This allows CPU core 14 to run at a maximum frequency for optimal performance. All other bus cycles are switched by the switching circuit 102 to the low-speed clock. This accommodates the execution of slower ISA cycles (i.e., peripheral bus cycle) and a corresponding reduction in the speed of the CPU clock to reduce power.

In the low-speed state, CPU clock, DMA clock and internal system clocks (peripheral bus clock) run at reduced rates, which are programmable. It is noted that the CPU clock signal, the peripheral bus clock signal and the DMA clock signal may be reduced in frequency by selectably controllable divider circuitry within switches 104, 124 and second divider 106. The highest allowable CPU clock rate during low speed state is an exemplary 9.2 MHz. Dynamic switching to the high speed clock (PS CLK) is disallowed. Optionally, the third phase-locked loop circuit 96 may be shut down in this mode, for additional power savings.

During the doze state, the CPU clock (low and high speed) is stopped, along with the DMA clock and the peripheral bus clock. The video, keyboard and timer clocks are enabled by default, but may be programmably turned off. By allowing these clocks to run, an LCD display coupled to video controller 34 is allowed to continue refreshing, and it is possible for timer and keyboard interrupts to be generated.

The sleep, suspend, and off states are similar in that the CPU clock, the peripheral bus clock, the DMA clock, and the keyboard clock are each off. The video clock as well as the UART clock may be programmed on or off.

It is noted that during various states of power management unit 24, external power-control pins of the integrated processor 10 may be driven appropriately such that the power to external devices connected to integrator processor 10 may be removed. This control may also be programmable.

It is further noted that the control of the various clock signals generated by clock control unit 26 may be accomplished in accordance with a variety of alternative power management algorithms. For example, integrated processor 10 may employ a power management unit which operates in accordance with the power management algorithm described within the copending, commonly assigned patent application entitled "Power Management System for an Integrated Processor", by O'Brien, et al.; Ser. No. 08/190, 292, filed Feb. 2, 1994. This application is incorporated herein by reference in its entirety.

Figure 5:
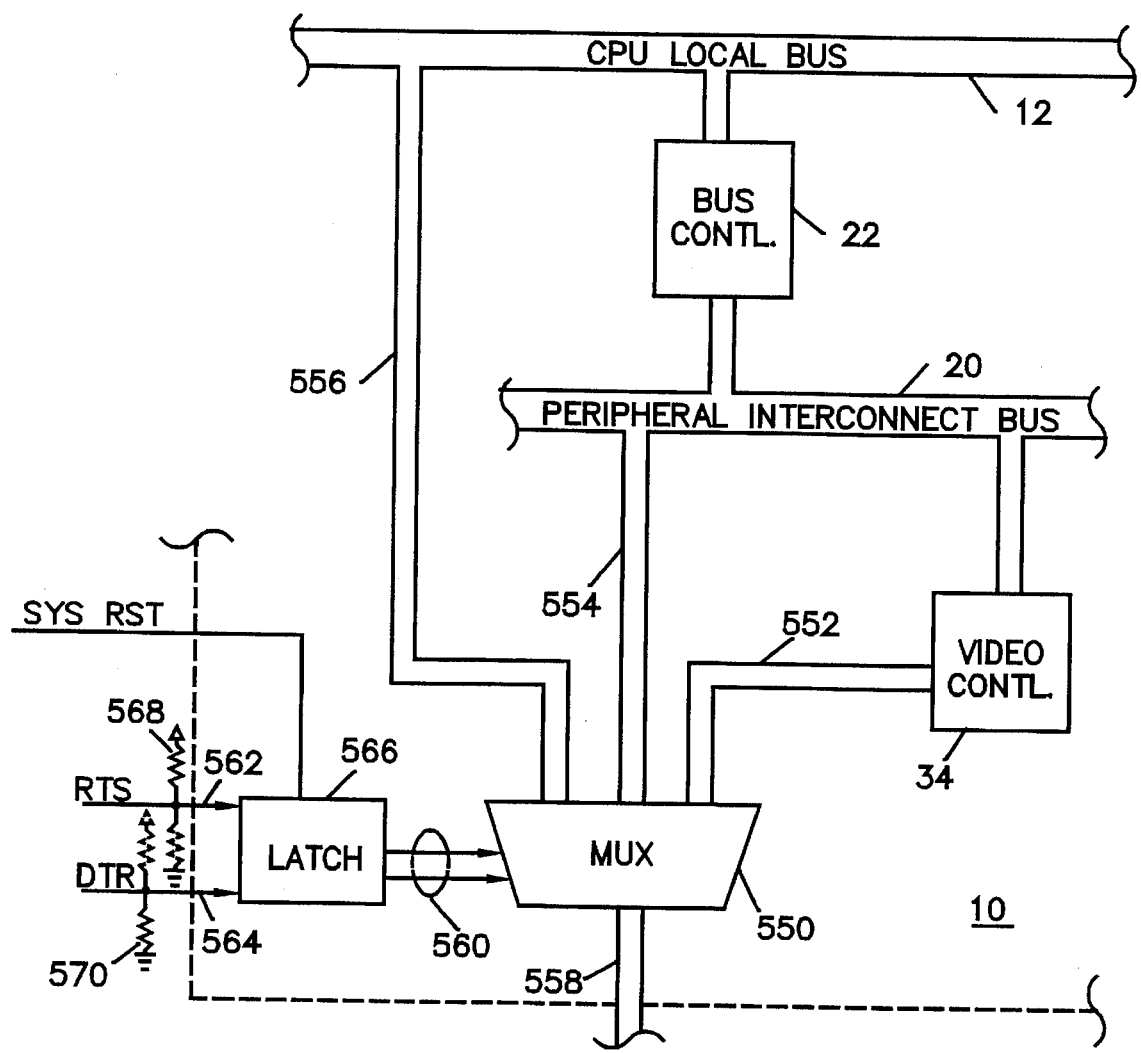
FIG. 5 is a multiplexing circuit employed within the integrated processor system to selectively control, by a user-defined pin option, the functionality of several external pins of the integrated processor.

Turning now to FIG. 5, a portion of internal circuitry within integrated processor 10 is illustrated which accommodates a user-defined external bus configuration option. Specifically, depending upon the particular PID environment in which integrated processor 10 is to be employed, the user can optionally select either a video controller mode (or "CGA mode"), a local bus mode, or an ISA (peripheral bus)bus mode. The circuitry of FIG. 5 includes a multiplexer 550 having three input ports and a single output port. One input port is connected to a selected set of lines 552 from video controller 34; another input port is connected to a selected set of peripheral interconnect bus lines 554; and yet another input port is connected to a selected set of CPU local bus output lines 556. Multiplexer 550 selects one set of lines, either lines 552, 554 or 556, to be coupled to external pins of integrated processor 10. Multiplexer 550 thereby supports an external bus configuration option whereby selected signals associated with either video controller 34, peripheral interconnect bus 20, or local bus 12 may be coupled to external pins of integrated processor 10. External local bus peripherals, external ISA bus peripherals, or an external CGA LCD display (with video RAM) may thereby be optionally supported depending upon the demands of a particular application.

Multiplexer 550 is controlled by a control signal at lines 560 provided from a latch 566. Latch 566 latches the logic levels at a set of lines 562 and 564 upon the rising edge of a system reset signal. The logic levels of input lines 562 and 564 are determined by external passive pull-up or pull-down resistors coupled to respective power and ground potentials. In one example shown, a pull-up resistor 568 and a pull-down resistor 570 are coupled to input lines 562 and 564. Pull-up resistor 568 is thereby used to passively pull high line 562 while pull-down resistor passively pulls down line 562. Instead of connecting a pull-up resistor 568 to input line 562, the user may, to select a different external pin mode, connect a pull-down resistor (shown in phantom) at input line 562 and/or connect a pull-up resistor (shown in phantom) at input line 564. By selectively connecting a pull-up or pull-down resistor at each input line, the system designer is able to optionally control the particular set of lines 552, 554, or 556 selected by multiplexer 550 to thereby control the functionality of the corresponding external pins of integrated processor 10. It is noted that following system reset, the pins connecting to lines 562 and 564 of latch 566 may be employed to accommodate other signals such as serial port signals RTS and DTR. In such a situation, the lines 562 and 564 are coupled in parallel to the RTS and DTR inputs of video controller 34. Such dual-purpose employment of the external pins of integrated processor 10 accommodates a further reduction in cost and size.

The following table represents an exemplary set of signals which can be selectively provided to the external pins of integrated processor 10 via multiplexer 550.

TABLE II

| Video Controller Option (CGA signals) | Local Bus Option (386 local bus signals) | Peripheral Bus Option (ISA signals) |
|---|---|---|
| PIRQ1 | PIRQ1 | IRQ6 |
| PIRQ0 | PIRQ1 | IRQ3 |
| DSMD7 | ADS# | 0WS# |
| DSMD6 | D/C# | DRQ0 |
| DSMD5 | M/IO# | DRQ3 |
| DSMD4 | W/R# | DRQ7 |
| DSMD3 | BHE# | IRQ9 |
| DSMD2 | BLE# | IRQ11 |
| DSMD1 | LRDY# | DRQ6 |
| DSMD0 | LDEV# | RESERVED |
| DSMA14 | A23 | LA23 |
| DSMA13 | A22 | LA22 |
| DSMA12 | A21 | LA21 |
| DSMA11 | A20 | LA20 |
| DSMA10 | A19 | LA19 |
| DSMA9 | A18 | LA18 |
| DSMA8 | A17 | LA17 |
| DSMA7 | A16 | DACK0# |
| DSMA6 | A15 | DACK3# |
| DSMA5 | A14 | DACK7# |
| DSMA4 | A13 | DACK6# |
| DSMA3 | CPUCLK | PULLUP |
| DSMA2 | CPURST | RESERVED |
| DSMA1 | NA# | IRQ7 |
| DSMA0 | 387RESET | PULLUP |
| DSWE# | 387ERR# | PULLUP |
| DSOE# | CPURDY# | LMEG# |
| DSCE# | DACK1# | DACK1# |
| LCDD0 | DRQ1 | DRQ1 |
| LCDD1 | DACK5# | DACK5# |
| LCDD2 | DRQ5 | DRQ5 |
| LCDD3 | IOCHCHK# | IOCHCHK# |
| M | IRQ4 | IRQ4 |
| CP1 | PREQ | IRQ5 |
| CP2 | BUSY# | IRQ10 |
| FRM | IRQ12 | IRQ12 |
| LVEE# | IRQ15 | IRQ15 |
| LVDD# | RESERVED | BALE |

It is noted that in one implementation, a group of additional predetermined lines of the internal ISA bus (peripheral bus 20) are permanently coupled to dedicated external pins of integrated processor 10 to support sixteen-bit external ISA transfers regardless of the particular mode selected via multiplexer 550. In such an implementation, the set of lines 554 of the ISA bus (as defined in the above table) may be optionally coupled externally via multiplexer 550 to support yet a broader range of ISA functionality.

Numerous variations and modifications will become apparent to those skilled in the art once the above disclosure is fully appreciated. For example, it is understood that DMA controller 28, timer 30, video controller 34, parallel/serial port 32, real time clock 41 and PCMCIA controller 42 could be alternatively connected to CPU local bus 12. It is intended that the following claims be interpreted to embrace all such variations and modifications.

What is claimed is:

1. A clock control unit configured within an integrated processor, comprising:

a frequency synthesizer comprising a plurality of frequency multipliers having phase-locked loop circuits coupled in series to receive an input signal clocked at a single frequency and to produce a plurality of output signals, each output signal is clocked at a distinct frequency determined by a plurality of enable signals forwarded to said frequency synthesizer; and a plurality of circuits connected to receive respective said plurality of output signals.

2. The clock control unit as recited in claim 1, wherein said phase-locked loop circuits comprise a first, second and third phase-locked loop circuit, said first phase-locked loop circuit is connected to receive said input signal, said second phase-locked loop circuit is connected to produce a low-speed clock signal, and said third phase-locked circuit is connected to produce a high-speed clock signal.

3. The clock control unit as recited in claim 2, wherein said high-speed clock is triggered at a faster rate than said low-speed clock signal, and wherein said high-speed clock signal is programmable to one of several frequencies by a configuration signal sent over a peripheral interconnect bus in accordance with a configuration register connected between the peripheral interconnect bus and the third phase-locked loop circuit.

4. The clock control unit as recited in claim 2, further comprising a dynamic clock switching circuit coupled to receive said low-speed clock signal and said high-speed clock signal and for switching onto the output of said switching circuit either the low-speed clock signal or the high-speed clock signal.

5. The clock control unit as recited in claim 1, wherein said frequency dividers comprise a set of counter circuits connected in parallel between one of said frequency multipliers and a set of said clock circuits.

6. A clock control unit configured within an integrated processor, comprising:

a first phase-locked loop circuit having an input connected to an oscillator and an output connected to a second phase-locked loop circuit;

a power management unit having a first enable output coupled to the second phase-locked loop circuit for activating the second phase-locked loop circuit in accordance with a power management state controlled by said power management unit; and a plurality of frequency dividers connected to an output of said second phase-locked loop circuit for producing, at times during which said second phase-locked loop circuit is active, a respective plurality of clock signals forwarded to a corresponding plurality of clocked circuits.

7. The clock control unit as recited in claim 6, wherein said power management state comprises one of several power management states selected from a list comprising: a normal state, a low speed state, a doze state, a sleep state and a suspend state.

8. The clock control unit as recited in claim 6, wherein said clock signals are triggered at dissimilar frequencies.

9. The clock control unit as recited in claim 6, wherein said clock signals comprise a keyboard clock signal, a DMA clock signal, a timer clock signal, a UART clock signal and a video clock signal.

10. The clock control unit as recited in claim 6, further comprising a first delay circuit connected between said oscillator and an input gated with said first enable output for enabling turn-on of said second phase-locked loop circuit after which said first phase-locked loop circuit is activated and during times in which said first enable output is active.

11. The clock control unit as recited in claim 6, wherein at least one of said plurality of frequency dividers includes an output coupled to a switch, wherein the switch is adapted for activation by a second enable output sent from said power management unit.

12. The clock control unit as recited in claim 6, further comprising a third phase-locked loop circuit having an input connected to an output of the second phase-locked loop circuit, wherein the third phase-locked loop circuit is adapted for providing a programmable, variable clock frequency.

13. The clock control unit as recited in claim 12, wherein the input of said third phase-locked loop circuit is connected to receive a third enable output sent from said power management unit, wherein said third enable output, when active, enables operation of the third phase-locked loop in accordance with a power management state detected by said power management unit.

14. The clock control unit as recited in claim 13, further comprising a second delay circuit connected between said oscillator and an input gated with said first and second enable outputs for enabling turn-on of said third phase-locked loop circuit after which said second phase-locked loop circuit is activated and during times in which said first and second enable outputs are active.

15. A power managed clock control unit within an integrated processor, comprising:
- a first phase-locked loop circuit having an input connected to an oscillator and an output connected to a second phase-locked loop circuit;
- a third phase-locked loop circuit having an input and an output, the input of said third phase-locked loop is connected to the second phase-locked loop circuit and the output of said third phase-locked loop circuit is connected to a dynamic clock switching circuit;
- a power management unit having an output coupled to said first, second and third phase-locked loop circuits for activating said first, second and third phase-locked circuits jointly and severally in accordance with a first set of enable outputs generated by said power management unit; and
- a plurality of frequency dividers connected to an output of said second phase-locked loop circuit and an output of said dynamic clock switching circuit for receiving a second set of enable outputs generated by said power management unit for activating said frequency dividers jointly and severally.

16. The clock control unit as recited in claim 15, wherein said first and second set of enable outputs are issued from said power management unit in accordance with a predetermined power management algorithm.

17. The clock control unit as recited in claim 15, further comprising a fourth phase-locked loop circuit having an input connected to the output of said second phase-locked loop circuit and an output of said fourth phase-locked loop coupled through a video clock frequency divider to produce a video clock signal coupled to a video controller.

18. The clock control unit as recited in claim 17, wherein said first, second, third and fourth phase-locked loop circuits each comprise a frequency multiplier.

19. The clock control unit as recited in claim 18, wherein said frequency multiplier includes a dissimilar frequency multiplication factor for each of said first, second, third and fourth phase-locked loop circuits.

20. The clock control unit as recited in claim 19, wherein said frequency multiplication factor for said third phase-locked loop circuit is programmable.

* * * * *